United States Patent
Quong

(10) Patent No.: US 9,223,941 B2
(45) Date of Patent: Dec. 29, 2015

(54) USING A URI WHITELIST

(71) Applicant: Google Inc., Mountain View, CA (US)

(72) Inventor: Russell Quong, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 214 days.

(21) Appl. No.: 13/832,972

(22) Filed: Mar. 15, 2013

(65) Prior Publication Data

US 2014/0283109 A1    Sep. 18, 2014

(51) Int. Cl.
*H04L 29/06* (2006.01)
*G06F 21/10* (2013.01)
*G06F 21/51* (2013.01)

(52) U.S. Cl.
CPC ............... *G06F 21/10* (2013.01); *G06F 21/51* (2013.01); *H04L 63/0236* (2013.01)

(58) Field of Classification Search
CPC ...... G06F 21/10; G06F 21/51; H04L 63/0236
USPC .......................................................... 726/27
See application file for complete search history.

(56) References Cited

U.S. PATENT DOCUMENTS

| | | |
|---|---|---|
| 2009/0288145 A1 | 11/2009 | Huber et al. |
| 2010/0162126 A1 | 6/2010 | Donaldson et al. |
| 2011/0083069 A1 | 4/2011 | Paul et al. |
| 2011/0314152 A1* | 12/2011 | Loder ........................... 709/225 |
| 2012/0036552 A1 | 2/2012 | Dare et al. |
| 2012/0069131 A1 | 3/2012 | Abelow |
| 2012/0180073 A1 | 7/2012 | Hung |
| 2012/0209923 A1 | 8/2012 | Mathur et al. |
| 2014/0150096 A1* | 5/2014 | Moon et al. ..................... 726/22 |
| 2014/0181792 A1* | 6/2014 | Fanning et al. ............... 717/124 |

* cited by examiner

*Primary Examiner* — Jeffrey D Popham
(74) *Attorney, Agent, or Firm* — Morris & Kamlay LLP

(57) ABSTRACT

A method and/or system for using a URI whitelist may include receiving a request to approve an application for release in an application store. The request may comprise application data. The application data may comprise a resource manifest and/or a Uniform Resource Identifier (URI) whitelist. The resource manifest may comprise, for example, one or more resource items. The URI whitelist may comprise, for example, one or more URI items. The request may be analyzed based on application data. A determination may be made whether the applications may be released in the application store based on the analyzing of the applications data. A request to access a particular URI may be received. A determination of whether to grant the request may be based on a resource manifest and/or a URI whitelist associated with the application.

14 Claims, 6 Drawing Sheets

USING A URI WHITELIST

TECHNICAL FIELD

Aspects of the present application relate to electronic devices. More specifically, certain implementations of the present disclosure relate to a method and/or system for using a Uniform Resource Identifier (URI) whitelist.

BACKGROUND

Various types of electronic devices are now commonly utilized. In this regard, electronic devices may include, for example, personal and non-personal devices, mobile and non-mobile devices, communication (wired and/or wireless) devices, general and special purpose devices. Examples of electronic devices may comprise cellular phones, smartphones, tablets, personal computers, laptops and the like. In some instances, various applications may run on the electronic devices. The applications may be directed to game application, personal applications and/or business applications.

Further limitations and disadvantages of conventional and traditional approaches will become apparent to one of skill in the art, through comparison of such approaches with some aspects of the present method and/or system set forth in the remainder of this disclosure with reference to the drawings.

BRIEF SUMMARY

Method and/or system for using a URI whitelist, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
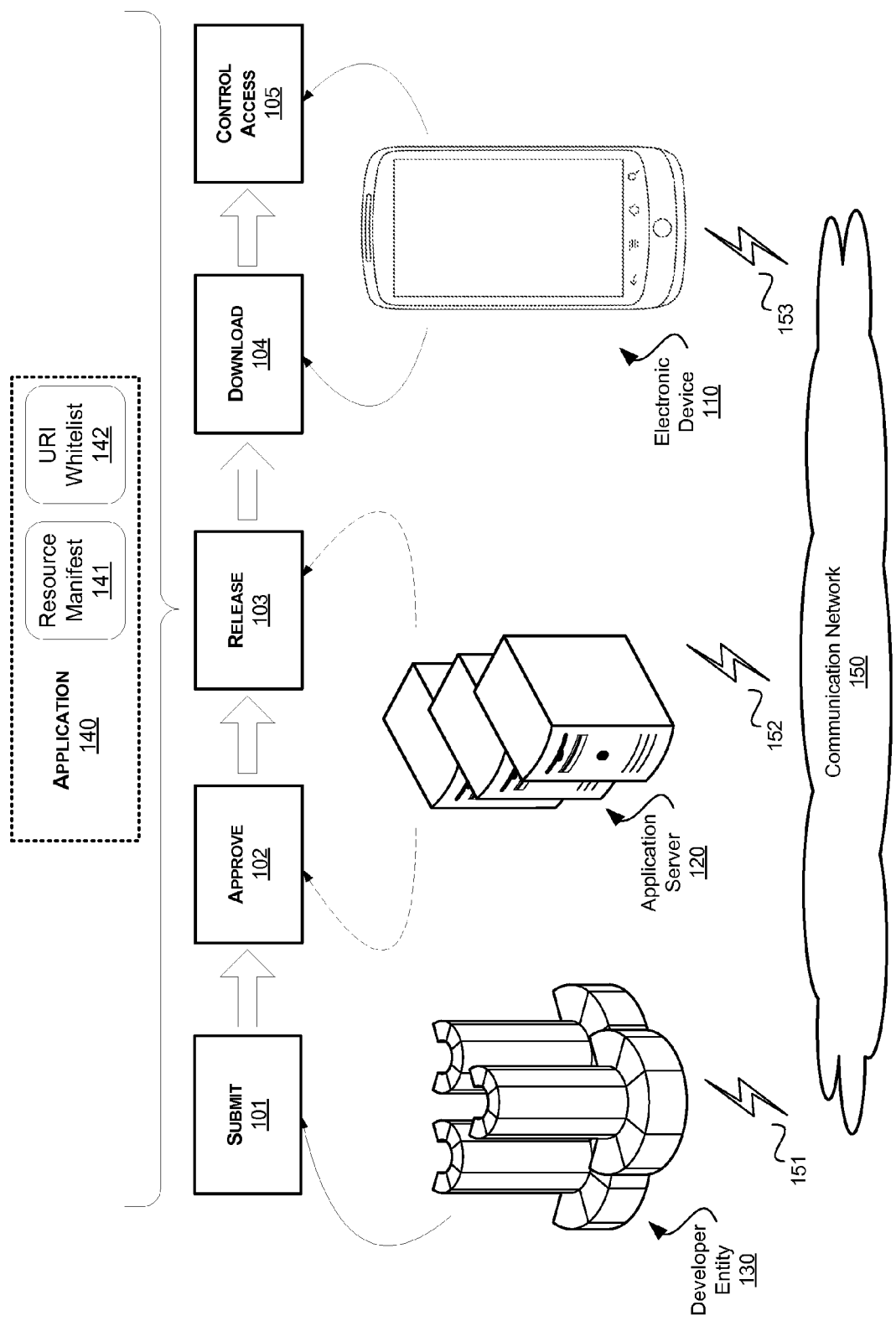
FIG. 1 is a block diagram of an example system for using a URI whitelist, in accordance with an example embodiment of the disclosure.

Certain embodiments of the disclosure may be found in a method and/or system for using a Uniform Resource Identifier (URI) whitelist. In various embodiments of the disclosure, a method and/or system for using a URI whitelist may include receiving a request to approve an application for release in an application store, where the application may be associated with an application developer. The request may comprise application data. The application data may comprise a resource manifest and/or a URI whitelist. The resource manifest may comprise, for example, one or more resource items. The URI whitelist may comprise, for example, one or more URI items.

The request may be analyzed based on application data. A determination may be made whether the application may be released in the application store based on the analyzing of the application data.

In an example embodiment of the disclosure, an approved application may be released to the application store in response to the request to approve the application for release in the application store. The approved application may comprise an approved resource manifest and/or an approved URI whitelist. The approved resource manifest may comprise, for example, one or more approved resource items. The approved URI whitelist may comprise, for example, one or more approved URI items. In an example embodiment of the disclosure, at least one of the URI items may not correspond to any of the one or more approved URI items. For example, one or more of the URI items on the URI whitelist may not be included on the approved URI whitelist as the approved URI items.

In an example embodiment of the disclosure, application receipt data may be communicated to the applications developer, where the application receipt data may comprise data indicative of whether the application was approved for release in an application store. The application data may comprise information data and option data. The information data may indicate that the application may be released in the applications store as an approved application. The option data may provide an option to the application developer to approve the release of the application in the application store as the approved application. The approved application may comprise an approved resource manifest and/or an approved URI whitelist. The approved resource manifest may comprise, for example, one or more approved resource items. The approved URI whitelist may comprise, for example, one or more approved URI items. In an example embodiment of the disclosure, at least one of the URI items may not correspond to any of the one or more approved URI items. For example, one or more of the URI items on the URI whitelist may not be included on the approved URI whitelist as the approved URI items.

In an example embodiment of the disclosure, modification approval data may be received from the application developer, where the modification approval data may comprise an approval by the application developer to release the application in the application store as the approved application.

In an example embodiment of the disclosure, a request to access the application may be received from an electronic device. A response to the request to access the mobile application may be sent to the electronic device, wherein the response comprises the application data.

In various embodiments of the disclosure, a method and/or system for using a URI whitelist may include receiving, from an application, a request to access a particular URI. A resource associated with the particular URI may be determined. A resource manifest associated with the application may be determined, where the resource manifest may comprise one or more resource items.

A determination whether the resource corresponds to at least one of the one or more resource items may be made. In a case where the resource corresponds to at least one of the one or more resource items, one or more of the following steps may be performed: (a) a URI whitelist associated with the application may be determined, where the URI whitelist may comprises one or more URI items; (b) a determination whether the particular URI corresponds to at least one of the one or more URI items may be made; (c) in a case where the particular URI corresponds to at least one of the one or more URI items, the request to access the particular URI may be granted; and/or (d) in a case where the particular URI does not correspond to any one of the one or more URI items, the request to access the particular URI may be denied.

In an example embodiment of the disclosure, in a case where the resource does not correspond to any one of the one or more resource items, the request to access the particular URI may be denied.

In an example embodiment of the disclosure, in a case where the particular URI does not correspond to any one of the one or more URI items, a notification on the electronic device may be presented, where the notification may comprise information indicative of the denial of the request to access the particular URI.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "block" refers to functions, processes, threads, etc. than can be performed by one or more circuits. As utilized herein, the term "e.g.," introduces a list of one or more non-limiting examples, instances, or illustrations. As utilized herein, the term "server" may refer to a plurality of machines, at least some of which may be installed in different locations, and each of which may be utilized to implement distinct and/or redundant functions associated with operations attributed to and/or performed by the server.

As utilized herein the term Uniform Resource Identifier (URI) may comprise one or more characters that may be associated with a network resource. A URI may comprise data associated with a host and/or a host-port pair. A URI may enable communication and/or interaction with a network resource with which it may be associated. A URI may comprise a scheme name (e.g., "http," "ftp," "mailto," "file") that may specify how a particular network resource may be accessed and/or a scheme dependent syntax identifying a particular resource. For example, for an "http" scheme, the scheme dependent syntax may, for example, be: "http://my-http.com". A URI may comprise one or more characters that may identify a particular network resource and/or one or more network resources that may meet a pattern represented by the URI. An example of a particular resource may be: "http://my-http.com/my-file.html". An example of a pattern may be: "http://myhttp.com/". For example, a URI represented by the example pattern "http://my-http.com/" may comprise one or more URI that meet the example pattern. Specifically, the following example URIs may meet the example pattern "http://my-http.com/": "http://my-http.com/files", "http://my-http.com/data.txt", "http://my-http.com/satellite?lat=123&long=456", etc.

A URI may comprise a Uniform Resource Locator (URL) that may identify a network resource through an access mechanism (e.g., a method for obtaining data and/or information associated with the network resource) and/or a network location. A URL may comprise data associated with a host, path, access protocol and/or other parameters. For example, a URL may be: "http://my-http.com/my-document.html". A URI may, for example, comprise a Uniform Resource Name (URN) that may identify a network resource by name. For example, a URN may be: "urn:isbn:12345". A URI may comprise a URL, URN and/or both.

FIG. 1 is a block diagram of an example system for using a URI whitelist, in accordance with an example embodiment of the disclosure. Referring to FIG. 1, there is shown a system 100 for using a URI whitelist. The system 100 may comprise an electronic device 110, an application server 120, a developer entity 130, an application 140 and/or a communication network 150.

The electronic device 110 may comprise suitable logic, circuitry, interfaces, and/or code that may be operable to communicate data and/or messages via wired and/or wireless connections configured in accordance with one or more supported wireless and or wired protocols, standards and/or interfaces (e.g., Ethernet, Bluetooth, WiFi, cellular, WiMAX, WLAN, NFC, etc.). The electronic device 110 may be operable to process, generate, present and/or output data and/or messages. The electronic device 110 may be enabled to perform, run, and/or execute various functions, operations, applications and/or programs based on, for example, user instructions and/or interactions, and/or pre-configured instructions. In this regard, the electronic device 110 may be operable to communicate, for example, with the application server 120 and/or the developer entity 130.

The electronic device 110 may comprise a cellular phone, smartphone, tablet, set-top box, television, laptop computer, desktop and/or personal computer, personal media player, other device which may communicate, process, generate, present and/or output data and/or other device that supports using a URI whitelist. The disclosure, and/or any implementation(s) in accordance therewith, however, are not limited to any particular type of an electronic device. The electronic device 110 may, for example, comprise the electronic device 200 as depicted in and/or described with respect to FIG. 2.

The application server 120 may comprise suitable logic, circuitry, interfaces, and/or code that may be operable to provide application approval services and/or application upsell services. For example the application server 120 may be enabled to provide application acceptance, screening (e.g., resource manifest evaluation, URI whitelist evaluation, etc.), processing, management and/or upsell (e.g., providing purchasing options to users of electronic devices (e.g., the electronic device 110) for purchasing applications submitted by, for example, a developer entity (e.g., the developer entity 130), etc.).

The application server 120 may also be operable to provide products and/or services related to an application store, such as, for example, managing applications in an application store for advertising and/or sale to users of electronic devices (e.g., the electronic device 110).

The application server 120 may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC, etc.) with electronic devices (e.g., the electronic device 110), developer entities (e.g., the developer entity 130) and/or other computing devices and/or entities. The application server 120 may be enabled to process, store, manage and/or communicate data and/or messages relevant to providing application approval and/or management services to developer entities (e.g., the developer entity 130) and/or application upsell services to electronic devices (e.g., the electronic device 110). Furthermore, the application server 120 may be operable to provide communication services to and from the electronic device 110, the developer entity 130 and/or other computing devices and/or entities. For example, the application server 120 may include one or more transceivers for providing wired and/or wireless communication of data to and from the electronic device 110, the developer entity 130 and/or other computing devices and/or entities via a communication network (e.g., the communication network 150) and/or one or more of the communication links (e.g., the communication link 151, 152 and/or 153).

The application server 120 may comprise a dedicated system and/or a general purpose system configured to provide application approval services (e.g., resource manifest evaluation, URI whitelist evaluation, etc.) to developer entities (e.g., the developer entity 130) and/or application upsell services (e.g., downloading, purchasing, etc.) to electronic device (e.g., the electronic device 110). The application server 120 may, for example, comprise the application server 300 as depicted in and/or described with respect to FIG. 3. The disclosure, and/or any implementation(s) in accordance therewith, however, are not limited to any particular type of an application server.

The developer entity 130 may comprise suitable logic, circuitry, interfaces, and/or code that may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC, etc.). The developer entity 130 may be operable to process, generate, present and/or output data and/or messages. The developer entity 130 may be enabled to perform, run, and/or execute various functions, operations, applications and/or programs based on, for example, user instructions and/or interactions, and/or pre-configured instructions. In this regard, the developer entity 130 may be operable to communicate, for example, with the electronic device 110 and/or the application server 120.

In an example embodiment of the disclosure, the developer entity 130 may be operable to communicate with the application server 120 through an application programming interface (API). In another example embodiment of the disclosure, the developer entity 130 may communicate with the application server via an on-line (e.g., web browser) interface. The API and/or the web interface may be provided and/or supported by an application server, such as, for example, the application server 120. In this regard, the developer entity 130 may be operable to automatically and/or in response to a user interaction send, utilizing, for example, the API and/or the web interface, a request to the application server 120, for the application server 120 to approve an application, such as, for example, the application 140, for release in an application store. The disclosure, and/or any implementation(s) in accordance therewith are not limited to any particular type of a communication interface.

The developer entity 130 may be operable to create, develop, program, store and/or manage applications, such as, for example, the application 140. The developer entity 130 may be interchangeably referred to as a developer entity, an application developer and/or an application developer entity. The application 140 may comprise, for example, various program(s) and/or application(s) intended to be installed, accessed and/or otherwise operable for use on an electronic device (e.g., the electronic device 110). An application (e.g., the application 140) may comprise, for example, one or more game(s), business application(s) (e.g., word processing, corporate e-mail access), personal application(s) (e.g., e-mail, web browsing, personal diary), social networking application(s) and other application(s) that may be intended for use on an electronic device (e.g., the electronic device 110).

In an example embodiment of the disclosure, the developer entity 130 may send, to an application server, such as, for example, the application server 120, a request comprising application data and/or the application 140 for an approval of the application 140 by the application server 120 for release in an application store. The application store may be supported and/or managed by, for example, the application server 120. In an example embodiment of the disclosure, the application store may be an application store accessible through an electronic device (e.g., the electronic device 110) that may be operable to provide a user of the electronic device with an option to browse, download and/or purchase various applications, such as, for example, the application 140.

The application 140 may comprise data that may be processed by an application server (e.g., the application server 120) and/or by an electronic device (e.g., the electronic device 110) on which the application is intended to be installed, used and/or otherwise interacted with by a user of the electronic device. For example, the application 140 may comprise a software program (e.g., game, personal application, business application, social networking application, etc.) that may be installed on an electronic device (e.g., the electronic device 110), accessed and/or interacted with by a user of the electronic device (e.g., the electronic device 110). The application 140 may comprise data and/or information that may be intended, for example, only for the application server 120, only for the electronic device 110 and/or both for the application server 120 and the electronic device 110. For example, the application 140 may comprise data and/or information intended for the application server 120 that may enable the application server 120 to evaluate the application 140 before the application 140 may be released by the application server 120 to an application store.

The application 140 may be associated with a resource manifest, such as, for example, the resource manifest 141, and/or a URI whitelist, such as, for example, the URI whitelist 142.

The resource manifest 141 may comprise one or more resource items. A resource item may correspond to a resource and/or a set (e.g., one or more) resources (e.g., camera interface(s), contact list(s), speaker(s), network(s), storage, microphone, GPS, standby prevention, etc.) associated with an electronic device (e.g., the electronic device 110). The resource manifest 141 may be associated with a particular application (e.g., the application 140). A resource manifest may comprise an example resource manifest 141 as depicted in and/or described with respect to FIG. 4.

In an example embodiment of the disclosure, the resource manifest 141 may be implemented as a list (e.g., a text file, XML file, etc.) of resource items. A resource item may be associated with a resource identifier (ID), resource name, and/or other resource data that may allow for an identification and/or access of a particular resource associated with an electronic device (e.g., the electronic device 110) for which the application 140 with which the resource manifest 141 may be associated.

The URI whitelist 142 may comprise one or more URI items. A URI item may correspond to a network resource and/or a set (e.g., one or more) network resources (e.g., a host, host-port pair, etc.). A URI item may comprise a URI that may correspond to one or more specific URIs and/or URIs that meet a predefined URI pattern. A URI whitelist may comprise an example URI whitelist 142 as depicted in and/or described with respect to FIG. 4.

In an example embodiment of the disclosure, the URI whitelist may be implemented as a list (e.g., a text file, XML file, etc.) of URI items (e.g., network resource items, etc.) A URI item (e.g. a network item) may be associated with a host (e.g., "my-server.com"), a protocol (e.g., "http," "ftp," etc.) and/or other network parameters (e.g., a name and/or identifier of a particular website, webpage, file, etc.). For example, an example URI item specifying "my-server" as a host using an "http" protocol with a path parameter "my-file.txt" may be in a form of: "http://my-server.com/my-file.txt". Another example URI specifying "my-server" as a host using an "http" protocol may be in a form of a URI pattern, such as, for example: "http://my-server.com/". A URI item that corresponds to a URI pattern, such as, for example, a particular example URI item "http://my-server.com/" may comprise one or more URIs that meet the URI pattern. For example, a particular example URI "http://my-servercom/maps/satellite?lat=123&long=456", or "http://my-server.com/images/", etc. may correspond to the example URI item, because the particular example URI(s) meets the URI pattern of the particular example URI item.

It is to be understood that when the present disclosure refers to, for example, comparing a particular URI with a particular URI item to determine whether the particular URI corresponds to the particular URI item, the present disclosure is not limited to any particular implementation of a comparison methods. Specifically the comparing of a URI with a URI item is not limited to any particular comparison method. The comparing of a URI with a URI item is not limited to a direct comparison (e.g., an exact match), but instead encompasses a variety of comparison methods. The comparison may comprise a URI pattern matching and/or other comparison methods. Furthermore, when the present disclosure refers to determining whether a particular URI corresponds to a particular URI item, it is to be understood that the correspondence includes a direct (e.g., through a direct comparison method) and/or a pattern correspondence (e.g., through a pattern matching comparison method). For example, a particular URI may correspond to a particular URI item if the particular URI either directly corresponds to the URI item and/or the particular URI meets a URI pattern represented by the particular URI item.

The present disclosure is not limited to a particular implementation of a resource manifest (e.g., the resource manifest 141), resource item(s), a URI whitelist (e.g., the URI whitelist 142) and/or URI item(s). Specifically, the present disclosure is not limited to, for example, an implementation of resource manifest and/or a URI whitelist as a list of items, resource or URI, respectively. It is to be understood that other implementations that are within the scope of the present disclosure include various implementations that may allow an application server (e.g., the application server 120) and/or an electronic device (e.g., the electronic device 110) to receive and/or process the resource manifest and/or the URI whitelist associated with a particular application (e.g., the application 140).

In an example embodiment of the disclosure, the application 140 may be associated with more than one of each of the resource manifest 141 and/or the URI whitelist 142. For example, the application 140 may be intended to be used on different types of electronic devices (e.g., a gaming platform, a smartphone, a tablet, etc.) and/or types of operating environments (e.g., an operating system). The application may be associated with one resource manifest and/or URI whitelist with respect to one device type (e.g., a smartphone) and/or an operating environment and another resource manifest and/or URI whitelist with respect to another device type (e.g., a tablet) and/or an operating environment.

In an example embodiment of the disclosure, the application 140 may be associated with more than one resource manifest but with one URI whitelist. For example, a declaration of resources that the application 140 may require access to may be device type specific and/or operating environment specific, while a declaration of URI items may be generic. For example, the declaration of URI items on a URI whitelist may comprise of one or more URI items, where some or all of the one or more URI items may correspond to a network resource that can be identified, referenced and/or accessed by a device and/or an operating environment irrespective of the type of the device and/or the operating environment.

The communication network 150 may comprise any combination of wired and/or wireless protocols, standards and/or interfaces (e.g. Ethernet, Bluetooth, WiFi, satellite and/or cellular network, WiMAX, WLAN, NFC, etc.) that enable communication between electronic devices (e.g., the electronic device 110), servers (e.g., the application server 120) and/or other computing devices and/or entities (e.g., the developer entity 130).

The communication network 150 may support communication on one or more communication links, such as, for example, the communication links 151, 152 and/or 153. Although the communication links 151, 152 and/or 153 are illustrated as separate communication links, the disclosure is not limited in this way. Specifically, the communication links 151, 152 and/or 153 may together comprise one or more communication links and/or may each separately comprise one or more communication links. Although the communication links 151, 152 and/or 153 may appear in FIG. 1 to be associated with a particular device, server and/or entity, the disclosure is not limited in this way. Specifically, the communication of various devices, servers and/or entities (e.g., the electronic device 110, the application server 120, the developer entity 130) with each other (e.g., directly and/or on the communication network 150), on and/or with the communication network 150 does not need to occur on a particular communication link (e.g., the communication link 151, 152 and/or 153). It is to be understood that the communication network 150, the communication links 151, 152 and/or 153 have been used for illustration purposes only and do not limit the present disclosure to any particular implementation of a communication network and/or communication links that may allow for communication between various devices, servers and/or entities consistent with the present disclosure.

Referring to FIG. 1, there is shown a plurality of actions, a submit action 101, an approve 102, a release 103, a download action 104 and/or a control access action 105. The submit action 101 may be performed by the developer entity 130. The approve action 102 and/or the release action 103 may be performed by the application server 120. The download action 104 and/or the control access action 105 may be performed by the electronic device 110.

In operation, a developer entity, such as, for example, the developer entity 130, may perform a submit action (e.g., the submit action 101). In this regard, the developer entity 130 may send, to an application server, such as, for example, the application server 120, a request to approve an application (e.g., the application 140) for release of the application in an application store. The request may comprise an application (e.g., the application 140), a representation of an application (e.g., executable instructions and/or code that may make the application operable on an electronic device) and/or application data. The application data may, for example, comprise a resource manifest (e.g., the resource manifest 141) and/or a URI whitelist (e.g., the URI whitelist 142) associated with the application (e.g., the application 140). The application data may also comprise other developer and/or application related data (e.g., developer name, developer identifier, application version, application category, application executable instructions, etc.).

In operation, an application server, such as, for example, the application server 120 may perform an approval action (e.g., the approval action 102). The approval action may be performed in response to a submit action (e.g., the submit action 101) that may have been performed at an earlier time by a developer entity, such as, for example, the developer entity 130. The approval action may not immediately follow a submit action. In an example embodiment of the disclosure, the application server 120 may have received one or more applications for approval for release in an application store from one or more developer entities (e.g., developer entity 130). The application server 120 may perform an approval action with respect to all or some of the one or more applications at the same time or at different times.

During an approval action, the application server 120 may, for example, determine whether an application (e.g., the application 140) may be approved for release in an application store. In this regard, the application server 120 may analyze the application and/or the application data that may have been received from a developer entity (e.g., the developer entity 130) during, for example, a submit action (e.g., the submit action 101). The analysis may be based on, for example, a resource manifest and/or a URI whitelist associated with the application, where the resource manifest and the URI whitelist may have been received as part of, for example, the application data.

In an example embodiment of the disclosure, the application server 120 may analyze the resource manifest (e.g., the resource manifest 141) to determine whether resource items associated with the resource manifest are, for example, necessary and/or reasonable with respect to resources of an electronic device (e.g., the electronic device 110) to which an access may be requested during an operation and/or execution of the application. For example, a social networking application may be associated with a resource manifest that, for example, includes resource items corresponding to the following example resources of an electronic device: network, camera interface, contact list, system settings, etc. The application server 120 may determine that, for example, an access to the network and/or camera interface resources may be necessary and/or reasonable and/or that an access to the contact list and/or the system setting resources may not be necessary and/or reasonable for the example social networking application.

In an example embodiment of the disclosure, the application server 120 may analyze the URI whitelist (e.g., the URI whitelist 142) to determine whether URI items associated with the URI whitelist are, for example, necessary and/or reasonable with respect to network resources to which an access may be requested during an operation and/or execution of the application. For example, a social networking application may be associated with a URI whitelist that, for example, includes URI items corresponding to the following example network resources: "http://www.my-social-life.com," "http://www.sell-personl-data.com," etc. The application server 120 may determine that, for example, an access to the network resource "http://www.my-social-life.com" may be necessary and/or reasonable and/or that an access to the network resource "http://www.sell-personal-data.com" (which may, for example, be associated with a known and/or determinable malicious network resource) may not be necessary and/or reasonable for the example social networking application.

The determination of whether an access by an application to a particular resource and/or network resource may be necessary and/or reasonable may be based on a variety of criteria, such as, for example, the type of the application, the developer entity with which the application is associated, the type of a resource and/or network resource to which access is requested, etc.

In an example embodiment of the disclosure, the application server 120 may not approve an application which may be associated with a resource manifest, where one or more resource items associated with the resource manifest correspond to a resource of an electronic device to which access by the application may not be necessary and/or reasonable. For example, the application server 120 may not approve the example social networking application because, for example, access to the contact list and/or the system settings resources of an electronic device may not be necessary and/or reasonable for the example social networking application.

In an example embodiment of the disclosure, the application server 120 may not approve an application which may be associated with a URI whitelist, where one or more URI items associated with the URI whitelist correspond to a network resource to which access by the application may not be necessary and/or reasonable. For example, the application server 120 may not approve the example social networking application because, for example, access to the network resource "http://www.sell-personal-data.com" may not be necessary and/or reasonable for the example social networking application.

In an example embodiment of the disclosure, the application server 120 may approve an application with a modified resource manifest. In this regard, even though the application may be associated with a resource manifest, where one or more resource items ("disapproved resource items") associated with the resource manifest correspond to a resource of an electronic device to which access by the application may not be necessary and/or reasonable, the application server 120 may modify the resource manifest and may remove the disapproved resource items associated with the resource manifest. For example, the application server 120 may approve the example social networking application with a modified resource manifest, where the modified resource manifest may not include the resource items corresponding to the contact list and/or system settings resources.

In an example embodiment of the disclosure, the application server 120 may approve an application with a modified URI whitelist. In this regard, even though the application may be associated with a URI whitelist, where one or more URI items ("disapproved URI items") associated with the URI whitelist correspond to a network resource to which access by the application may not be necessary and/or reasonable, the application server 120 may modify the URI whitelist and may remove the disapproved URI items associated with the URI whitelist. For example, the application server 120 may approve the example social networking application with a modified URI whitelist, where the modified URI whitelist may not include the URI items corresponding to the "http://www.sell-personl-data.com" network resource.

In an example embodiment of the disclosure, during an approval action, the application server 120 may communicate application receipt data to the developer entity 130 associated with that application 140. In this regard, the application receipt data may comprise data and/or information indicative of whether the application 140 was approved for release in an application store.

In an example embodiment of the disclosure, the application server 120 may approve an application with a modified resource manifest and/or URI whitelist, as previously described, automatically and/or conditionally. For example, in an automatic approval, the application server 120 may approve an application with a modified resource manifest and/or URI whitelist based on, for example, only a submit action (e.g., the submit action 101). For example, in a conditional approval, the application server 120 may communicate to a developer entity (e.g., the developer entity 130) data and/or information indicating that the application may be approved for release in an application store if the developer entity approves the modified resource manifest and/or the modified URI whitelist. The data and/or information may be a part of an application receipt data.

In an example embodiment of the disclosure, when an application (e.g. application 140) was not approved (and/or was conditionally approved) for release in an application store, the application receipt data may comprise data and/or information indicative of, for example, one or more reasons for denial to release the application 140 in an application store. For example, the one or more reasons for denial may be related to a resource manifest (e.g., resource manifest 141) and/or URI whitelist (e.g. URI whitelist 142) associated with the application 140.

In an example embodiment of the disclosure, the application receipt data may comprise, for example, an option (and/or instructions) to automatically and/or manually modify a resource manifest (e.g., the resource manifest 141) and/or a URI whitelist (e.g., the URI whitelist 142) associated with the application 140, such that, the application 140 may be in a condition for approval for release in an application store as a result of the modification(s). The option may be associated with the conditional approval as previously described (e.g., an approval of an application with a modified resource manifest and/or a modified URI whitelist).

In an example embodiment of the disclosure, an example automatic option to modify a resource manifest (e.g., the resource manifest 141) and/or a URI whitelist (e.g., the URI whitelist 142) associated with the application 140 may be associated with, for example, providing an automated method for the developer entity 130 to send to the application server 120 a request to automatically modify the resource manifest and/or the URI whitelist based on, for example, modifications proposed by the application server 120 that may have been communicated to the developer entity 130 along with, for example, the application receipt data. For example, the application server 120 may communicate to the developer entity 130 a message including, for example, a hyperlink and/or any other method that may allow the developer entity 130 associated with the application 140 to send a request to the application server 120 to automatically modify the resource manifest and/or the URI whitelist.

In an example embodiment of the disclosure the message may be an e-mail message. The e-mail message may comprise, for example, a representation of a proposed resource manifest modification and/or a proposed URI whitelist modification that may bring the application 140 into a condition for allowance for release in the application store. The e-mail message may provide an option to the developer entity 130 to respond to the proposed resource manifest and/or the proposed URI whitelist modification. In an example embodiment of the disclosure, the option may be an option to automatically modify the resource manifest and/or the URI whitelist by replacing the resource manifest and/or the URI whitelist with the proposed resource manifest and/or the proposed URI whitelist, respectively, and/or by accepting modifications to the resource manifest and/or the URI whitelist.

The option may be in a form of, for example, a hyperlink, a shortcut and any other method that would facilitate an automated (e.g., without custom user input) communication between the developer entity 130 and the application server 120. For example, if the option is in a form of a hyperlink, the developer entity 130 may process the hyper link (e.g., automatically though an API that may allow communication between the developer entity 130 and the application server 120, manually though a user interaction—selecting and/or interacting with the hyperlink, etc.). The processing of the hyperlink may cause the developer entity 130 to send, to the application server 120, a message, such as, for example, an automatically generated e-mail and/or any other communication that may be received and/or processed by the application server 120.

In another example embodiment of the disclosure, the option may be in a form of a text communication. For example, the text communication may direct the developer entity 130 to, for example, log into a developer account associated with the developer entity 130. It is to be understood that the text communication may also include, for example, an option to automatically log into the developer account by, for example, opening a developer interface (e.g., a web browser interface, etc.) and/or re-directing to a developer interface that may provide an option, for the developer entity 130, to respond to the proposed modifications to the resource manifest and/or the URI whitelist.

In operation, an application server, such as, for example, the application server 120 may perform a release action (e.g., the release action 103). The release action may be performed in response to an approval action (e.g., the approval action 102) that may have been performed at an earlier time by the application server 120.

During a release action, the application server 120 may release an application (e.g., the application 140) to an application store. The application may be released to an application store if, for example, the application was approved for release during an approval action (e.g., the approval action 102).

In an example embodiment of the disclosure, during a release action, the application server 120 may send application receipt data to the developer entity 130 associated with that application 140. In this regard, the application receipt data may comprise data and/or information indicative of whether (and/or when) the application 140 may be released in an application store.

In operation, an electronic device, such as, for example, the electronic device 110, may perform a download action (e.g., the download action 104). The download action may be performed in response to, for example, a request by the electronic device (e.g., through user input) to, for example, download and/or purchase an application (e.g., the application 140). The download action may be performed with respect to one or more applications (e.g., the application 140) that may be available in an application store (e.g., an application store managed and/or supported by an application server, such as, for example, the application server 120) and/or suitable for consumption of the electronic device (e.g., supported by the electronic device, the electronic device's operating system, etc.).

In an example embodiment of the disclosure, when an application (e.g., the application 140) is downloaded to an electronic device, the application may be downloaded with an associated resource manifest (e.g., the resource manifest 141) and/or an associated URI whitelist (e.g., the URI whitelist 142).

In an example embodiment of the disclosure, the contents (e.g., items) of a resource manifest (e.g., the resource manifest 141) and/or a URI whitelist (e.g., the URI whitelist 142) associated with an application (e.g., the application 140) that, for example, is intended to be downloaded to an electronic device (e.g., the electronic device 110), may be revealed to a user of the electronic device, for example before and/or after the application is purchased and/or downloaded. In an example embodiment of the disclosure, the contents may be available for review to the user when the user requests the review (e.g., though an interface associated with an application store and/or a graphical user interface (GUI) that may allow the user to review the application, change the applications settings, etc.)

In an example embodiment of the disclosure, a user of an electronic device (e.g., the electronic device 110) may have a full and/or limited control over resource manifest (e.g., the resource manifest 141) and/or a URI whitelist (e.g., the URI whitelist 142) associated with an application (e.g., the application 140) installed on (e.g., downloaded to the electronic device). For example, the user may be able to modify the contents (e.g., items) of the resource manifest and/or the URI whitelist after an application was downloaded (e.g., the download action 104) to the electronic device.

In an example embodiment of the disclosure, the user may be able to, for example, toggle (e.g., enable/disable, allow/disallow, turn on/off, etc.) access by an application (e.g., the application 140) to a particular resource (e.g., an item associated with the resource manifest) and/or a particular network resource (e.g., an item associated with the URI whitelist). A user may be able to toggle access at various times, such as, for example, when an application is downloaded to the electronic device (e.g., the download action 104), when the application request access to a particular recourse and/or network resource (e.g., a user may be presented with a prompt to allow and/or deny access) and/or at any other time (e.g., by accessing settings associated with the application). The toggle action may provide a user with a customized access approval process to resources and/or network resources that may have been previously evaluated and/or approved by an application server (e.g., the application server 120) during, for example an application approve (e.g., the approve action 102) and release (e.g., the release action 103) process.

In operation, an electronic device, such as, for example, the electronic device 110, may perform a control access action (e.g., the control access 105). The control access action may be performed in response to, for example, a request by an application (e.g., the application 140) running and/or executing on an electronic device, to access a particular resource on the electronic device and/or a network resource.

For example, the control access action may be performed when an application requests access to a particular resource of an electronic device, such as, for example, a network resource. During the control access action, the electronic device may detect that an application requested access to the network. The electronic device may determine whether the application may be granted access to the network by analyzing a resource manifest associated with the application. For example, if one of the resource items of the resource manifest corresponds to the network, the electronic device may grant the application access to the network.

In an example embodiment of the disclosure, when an application requests access to the network (and, for example, is granted such access based on a resource manifest), the electronic device may determine to what particular network resource the application requests access. For example, the application may request to access an example network resource "http://my-app.com". In this regard, the electronic device may analyze a URI whitelist to determine whether the particular network resource (e.g., "http://my-app.com") corresponds to one or more URI items. If the particular network resource correspond to one or more URI items (e.g., by exact URI match and/or a URI pattern match), access to the particular network resource may be granted. Otherwise, the access to the particular network resource may be denied (e.g., even if the application may have been granted access to the network based on the resource manifest associated with the application).

In an example embodiment of the disclosure, a malicious application (e.g., an application intended to compromise security of an electronic device and/or data, including personal user data) may be prevented from compromising security of an electronic device on which it is installed (e.g., to which it is downloaded and/or on which it executes) and/or of sensitive data and/or personal user data (e.g., e-mail account information, passwords, contact list, etc.). In this regard, when a malicious application (e.g., the application 140) is submitted (e.g., the submit action 101) by a developer entity (e.g., the developer entity 130) to an application server (e.g., the application server 120) for an approval for release in an application store, the application may have to be associated with a resource manifest (e.g., the resource manifest 141) and/or a URI whitelist (the URI whitelist 142). During an approval process (e.g., the approval action 102), the application server may determine that the application submitted for approval is malicious based on the content (e.g., items) of the resource manifest and/or the URI whitelist. The application server may not approve the application for release in an application store based on the determination that the application is malicious.

In an example embodiment of the discourse, a well-intentioned application (e.g., a non-malicious application) may be compromised after it has already been approved for release (e.g., the approve action 102) and/or released (e.g., the release action 103) to an application store. For example, a well-intentioned application may be downloaded (e.g., the download action) to an electronic device (e.g., the electronic device 110). The well-intentioned application may be compromised by, for example, another application, a code bug in the well-intentioned application and/or another application, etc. In this regard, when the compromised well-intentioned application requests access to a malicious network resource (e.g., due to malicious activity affecting the application), the electronic device may not approve access to the malicious network resource. Specifically, when the well-intentioned application was approved for release and/or released to an application store it may have been associated with a resource manifest (e.g., the resource manifest 141) and/or a URI whitelist (the URI whitelist 142). Because the application was well-intentioned, the URI whitelist may not include a URI item corresponding to the malicious network resource. The electronic device during, for example, an access control action (e.g. the access control action 105) may determine that the malicious network resource does not correspond to any URI items associated with the URI whitelist and may not approve the application to access the malicious network resource.

In an example embodiment of the disclosure, a well-intentioned application (as previously described) may be compromised by accessing an approved network resource (e.g., a particular network resource that may correspond to a URI item on the URI whitelist associated with the well-intentioned application) where the approved network resource may have been compromised itself by, for example, a malicious attack on a host (e.g., "my-app.com", etc.) associated with the approved network resource. In this regard, the electronic application may approve the well-intentioned application's request to access the network (e.g., where the network corresponds to one or more resource items associated with a resource manifest associated with the well-intentioned application) and/or to a particular network resource (e.g., where the particular network resource corresponds to one or more URI items associated with a URI whitelist associated with the well-intentioned application). The electronic device may monitor the well-intentioned application's access to the network and/or to the particular network resource (e.g., "http://my-app.com"). In this regard, the electronic device may determine that, for example, an access to the particular network resource (e.g., "http://my-app.com") resulted in a redirect from the particular network resource (e.g., "http://my-app.com") to a malicious network resource (e.g., "http://steal-my-data.com"), for example, because the particular network resource was compromised. The electronic device may prevent the well-intentioned application's access to the malicious network resource by, for example, not approving the well-intentioned application's access to the particular network resource that may correspond to one or more approved URI items (e.g., URI items associated with the URI whitelist associated with the well-intentioned application).

In an example embodiment of the disclosure, an electronic device (e.g., the electronic device 110) may monitor resource(s) of the electronic device to determine whether a particular application (e.g., application 140) requested access to a particular resource. For example, the electronic device may monitor resource(s) of the electronic device and may detect that a particular application is attempting to access a particular resource. In this regard, the electronic application may grant access to the particular resource (e.g., if the particular resource corresponds to a resource item associated with a resource manifest (e.g., the resource manifest 141) associated with the application).

In an example embodiment of the disclosure, the electronic device (e.g., the electronic device 110) may monitor a resource of the electronic device associated with the network to determine whether a particular application (e.g., application 140) requested access the network. If the particular application requested access to the network, the electronic device may monitor the particular application (and/or the network) to determine whether the application requested access to a particular network resource. For example, the electronic device may detect that a particular application is attempting to access a particular network resource. In this regard, the electronic application may grant access to the particular network resource (e.g., if the particular network resource corresponds to a URI item associated with a URI whitelist (e.g., the URI whitelist 142) associated with the application).

In an example embodiment of the disclosure, an electronic device (e.g., the electronic device 110) may monitor applications on the electronic device to determine whether a particular application (e.g., application 140) requested access to a particular resource and/or a network resource. The monitoring may be ongoing and/or continuous (e.g., monitoring of some or all active application) and/or may occur at pre-defined time intervals and/or on an occurrence of a pre-defined condition (e.g., a lunch and/or execution of an application, a request to access a particular resource, etc.). In this regard, the electronic application may grant access to the particular resource (e.g., if the particular resource corresponds to a resource item associated with a resource manifest (e.g., the resource manifest 141) associated with the application) and/or network resource (e.g., if the particular network resource corresponds to a URI item associated with a URI whitelist (e.g., the URI whitelist 142) associated with the application).

In an example embodiment of the disclosure, a request by an application (e.g., the application 140) to access a particular resource and/or a network resource may be generated by the application and/or may occur in response and/or as a consequence of the application execution of a particular function. For example, an application may request access to a particular resource and/or network resource before it accesses the particular resource and/or the network resource and/or at the time of accessing (e.g., attempting to access) the particular resource and/or the network resource. In another example embodiment of the disclosure, the application may initiate execution of a function, which, for example, may in turn require access to a particular resource and/or a network resource. In another example embodiment of the disclosure, the application may call a system function (e.g., associated with, for example, an operating system of the electronic device) that may be associated with a particular resource and/or a network resource. The disclosure is not limited to any particular implementation of accessing a resource and/or a network resource, and/or requesting access to a particular resource and/or network resource, etc.

In an example embodiment of the discourse, an electronic device (e.g., the electronic device) may communicate with an application server (e.g., the application server 120) and/or a developer entity (e.g., the developer entity 130) associated with an application that may have been compromised to notify the application server and/or the developer entity of the suspicious (e.g., malicious, etc.) activity by the application.

The application server may (e.g., the application server 120), in response to the communication about the suspicious activity (and/or a pre-determined number of communications regarding the same application), communicate with the developer entity (e.g., the developer entity 130) associated with the application to notify the developer entity that, for example, the application may have been compromised (e.g., due to a bug in application code, due to an attack on a host that an application is otherwise authorized to access, etc.).

In an example embodiment of the disclosure, the application server 120 may provide and/or manage developer registration services. A developer entity, such as, for example the developer entity 130 may register with the registration/authentication services provided by the application server 120, by for example creating a developer account. The registration services may provide, for example, for a graphical user interface (GUI), where a user associated with the developer entity 110 may initiate a registration process for the developer entity 130.

In an example embodiment of the disclosure, the application server 120 may provide and/or manage developer authentication services. For example, during an application approval process, the application server 120 may provide a prompt to a user associated with the developer entity 130 for authentication data and/or information. The developer entity 130 (e.g., in response to user input and/or a predefined criteria) may send the authentication data and/or information to the application server 120 for authenticating the developer entity 130.

In an example embodiment of the disclosure, the application server 120 may automatically authenticate the developer entity 130 when, for example the developer entity 130 itself (e.g., without a user's intervention) or through a user associated with the developer entity 130, sends a request to the application server 120 for the application server 120 to approve an application for releasing in an application store. In this regard, when the application server 120 receives the request, the application server 120 may verify the identity of the developer entity 130. For example, the application server 120 may initiate and/or perform a search on a developer database to determine whether the developer entity 130 corresponds to a particular developer entity and authenticate the particular developer entity based on the correspondence.

Although actions 101, 102, 103, 104 and/or 105 may have been illustrated in sequence, the present disclosure is not limited in this way. For example, an application may be submitted (e.g. the submit action 101) by a developer entity to an application server and the application server may not immediately respond to the submit action, with, for example, an approval action (e.g., the approval action 102.) For example, the application server may proceed with approving (or disapproving) applications from release in an application store based on the submit actions, in sequence (e.g., first in, first out, etc.) and/or based on application priority (e.g., an application associate with, for example, a particular category, particular developer entity, etc., may have priority over another application associated with a different category and/or a different developer, etc.).

Although FIG. 1 shows a particular sequence of actions (e.g., the action 101, 102, 103, 104, 105), the present disclosure is not limited to a particular sequence of the actions. Furthermore, the present disclosure is not limited to performing all actions in the example sequence. For example, each action may be performed independently. It is to be understood that the description of the actions and the sequence of the actions in the present disclosure has been chosen to simplify and not to limit the disclosure. Specifically, it is to be understood that a particular application may be subject to one or more actions by, for example, a developer entity (e.g., the developer entity 130) and/or an application server (e.g., the application server 120) before, for example, it may be available for consumption (e.g., purchase, download, etc.) on an electronic device (e.g., the electronic device 110). It is to be further understood that the control of resource access (e.g., the action 105) may be performed one or more times by an electronic device (e.g., the electronic device 110) with respect to one or more applications (e.g., the application 140).

In situations in which an example embodiment of the disclosure may collect personal information about users (e.g., users of electronic devices), or may make use of personal information, the users may be provided with an opportunity to control whether programs, applications, functions and/or features collect user related information (e.g., information about a user's social network, social actions or activities, profession, a user's preferences, a user's current location, etc.), and/or to control whether and/or how to receive applications supporting using a URI whitelist from an application server (e.g., application server 120).

In addition, certain data may be treated in one or more ways before it is stored and/or used, so that personally identifiable information is removed. For example, a user's identity may be treated so that no personally identifiable information can be determined for the user, or a user's geographic location may be generalized where location information is obtained (e.g., such as to a city, ZIP code, or state level), so that a particular location of a user cannot be determined. Thus, the user may have control over how information is collected about the user and used by, for example, an application server (e.g., application server 120).

Figure 2:
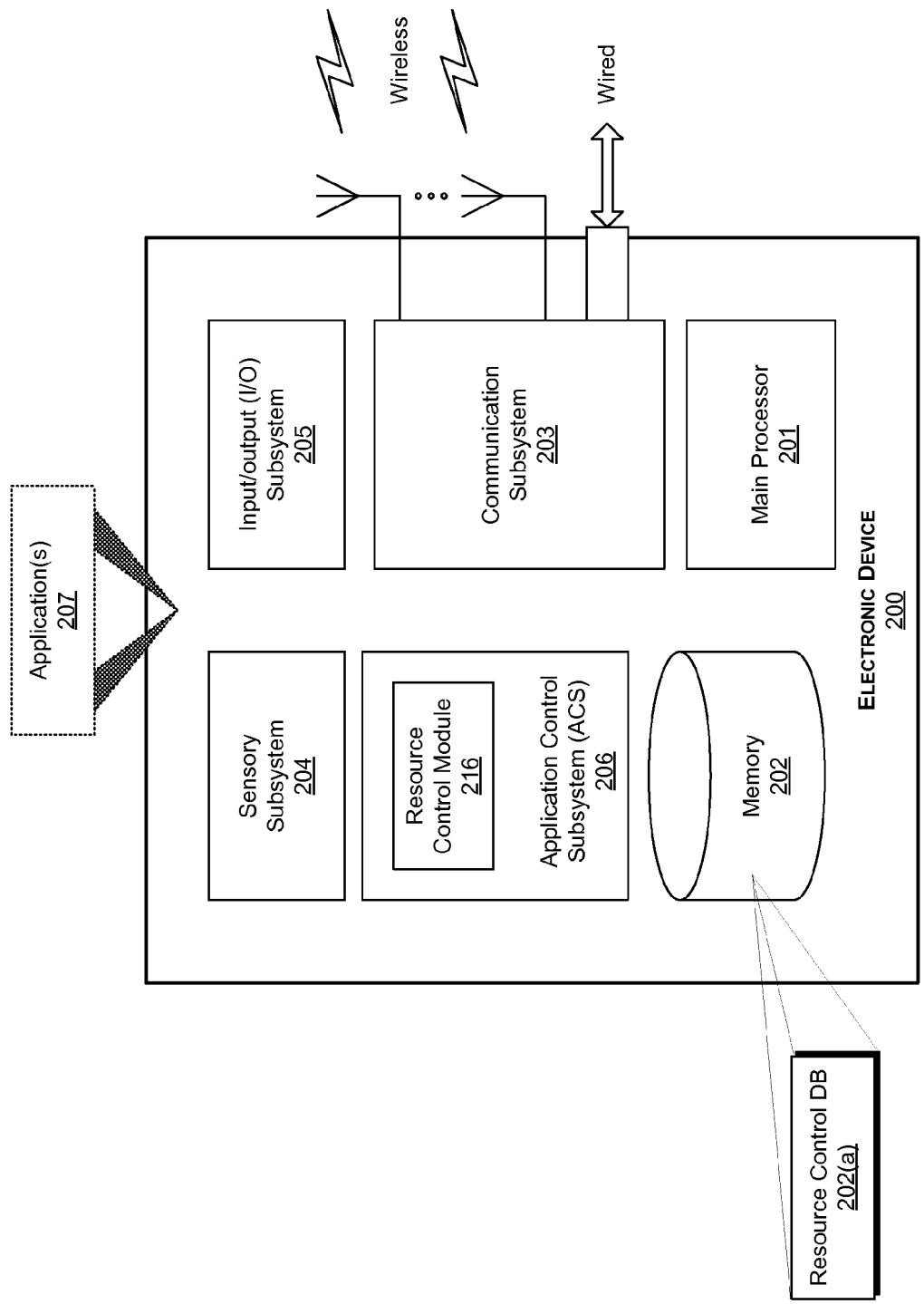
FIG. 2 is a block diagram of an example electronic device that supports using a URI whitelist, in accordance with an example embodiment of the disclosure.

FIG. 2 is a block diagram of example electronic device that supports using a URI whitelist, in accordance with an example embodiment of the disclosure. Referring to FIG. 2, there is shown an electronic device 200.

The electronic device 200 may comprise suitable logic, circuitry, interfaces, and/or code that may be operable to implement various aspects of the disclosure. In this regard, the electronic device 200 may correspond to the electronic device 110, as depicted in and/or described with respect to FIG. 1. The electronic device 200 may comprise, for example, a main processor 201, a memory 202, a communication subsystem 203, a sensory subsystem 204, an input/output (I/O) subsystem 205 and/or an application control subsystem (ACS) 206.

The main processor 201 may comprise suitable logic, circuitry, interfaces, and/or code that may be operable to process data, and/or control and/or manage operations of the electronic device 200, and/or tasks and/or applications performed therein. In this regard, the main processor 201 may be operable to configure, manage and/or control operations of various components and/or subsystems of the electronic device 200, such as, for example, the memory 202, the communication subsystem 203, the sensory subsystem 204, the I/O subsystem 205 and/or the ACS 206, by utilizing, for example, one or more control signals. The main processor 201 may enable running and/or executing applications, programs and/or code, which may be stored, for example, in the memory 202. Alternatively, one or more dedicated application processors may be utilized for running and/or executing applications, programs and/or code in the electronic device 200. In some instances, the applications running and/or executing on the electronic device 200 may comprise one or more application(s) 207, which may support using a URI whitelist. Some or all of the one or more application(s) 207 may correspond to the application 140 as depicted in and/or described with respect to FIG. 1.

The memory 202 may comprise suitable logic, circuitry, interfaces, and/or code that that may be operable to enable permanent and/or non-permanent storage, buffering, and/or fetching of data, code and/or other information, which may be used, consumed, and/or processed by the components of the electronic device 200. In this regard, the memory 202 may be enabled to store executable instructions to manage and/or configure, for example, the main processor 201, the communication subsystem 203, the sensory subsystem 204, the input/output (I/O) subsystem 205 and/or the ACS 206. The memory 202 may store, for example, configuration data, which may comprise parameters and/or code, comprising software and/or firmware. The memory 202 may comprise different memory technologies, including, for example, read-only memory (ROM), random access memory (RAM), low latency nonvolatile memory, flash memory, solid-state drive (SSD), field-programmable gate array (FPGA), and/or other suitable electronic data storage capable of storing data, code and/or other information.

The memory 202 may comprise a resource control database, such as, for example, the resource control database 202(*a*). The resource control database 202(*a*) may comprise a plurality of database objects each corresponding to a particular resource and/or application.

In an example embodiment of the disclosure, the resource control database 202(*a*) may store, process and/or manage access permissions to resources and/or network resources on a per resource basis. For example, the resource database 202(*a*) may store, process and/or manage a representation of resources of the electronic device 200 and may for one or more of the resources store, process and/or manage a representation of an application (e.g., application(s) 207) that may be allowed access to the one or more resources (e.g., a representation of a resource manifest associated with an application).

In an example embodiment of the disclosure, the resource control database 202(a) may store, process and/or manage access permissions to resources and/or network resources on a per application basis. For example, the resource database 202(a) may store, process and/or manage a representation of application(s) (e.g., applications(s) 207) and/or application (s) data (e.g., application name, application type (e.g., game, business application, personal application, social networking application, etc.), a developer entity associated with the application, a resource manifest, a URI whitelist) and may for one or more of the application(s) store, process and/or manage a representation of one or more resources that the application (s) may be allowed to access (e.g., based on a resource manifest associated with the application(s)).

In an example embodiment of the disclosure, the resource control database 202(a) may store, process and/or manage representation of URI whitelist(s) associated with application (s) (e.g., application(s) 207).

The disclosure is not limited to a particular implementation of the resource control database 202(a). Furthermore, it is to be understood that the permissions to access particular resources and/or network resources (e.g., associated with a resource manifest and/or a URI whitelist, respectively) do not need to be stored, processed and/or managed by a database (e.g., the resource control database 202(a)), but may be implemented otherwise. For example, the permission to access particular resources and/or network resources may be implemented as part of the application code, software, application programming interface (API), operating system and/or platform of the electronic device 200, etc.

The communication subsystem 203 may comprise suitable logic, circuitry, interfaces, and/or code that may be operable to communicate data from and/or to the electronic device 200, such as via one or more wired and/or wireless connections. For example, the communication subsystem 203 may comprise one or more transceivers for providing wired and/or wireless communication of data. The communication subsystem 203 may be configured to support one or more wired and/or wireless protocols, standards and/or interfaces (e.g., Ethernet, Bluetooth, WiFi, satellite and/or cellular network, WiMAX, WLAN, NFC, etc.) facilitating transmission and/or reception of signals to and/or from the electronic device 200, and/or processing of transmitted or received signals in accordance with applicable wired or wireless protocols. In this regard, signal-processing operations may comprise filtering, amplification, analog-to-digital conversion and/or digital-to-analog conversion, up-conversion/down-conversion of baseband signals, encoding/decoding, encryption/decryption, and/or modulation/demodulation.

The sensory subsystem 204 may comprise suitable logic, circuitry, interfaces, and/or code that may be operable to obtain and/or generate sensory information, which may relate to the electronic device 200, its user(s), and/or its environment. For example, the sensory subsystem 204 may comprise positional or locational sensors (e.g., GPS, GNSS, WiFi, BT, BTL, BTLE sensors, etc.), ambient condition sensors (e.g., temperature, humidity, or light), and/or motion related sensors (e.g., accelerometer, gyroscope, pedometers, and/or altimeters).

The I/O subsystem 205 may comprise suitable logic, circuitry, interfaces, and/or code that may be operable to enable user interactions with the electronic device 200, obtain input from user(s) of the electronic device 200 and/or provide output to the user(s). The I/O subsystem 205 may support various types of inputs and/or outputs, including, for example, video, audio, and/or textual. In this regard, dedicated I/O devices and/or components, external to or integrated within the electronic device 200, may be utilized for inputting and/or outputting data during operations of the I/O subsystem 205. Example (external or integrated) I/O devices may comprise displays, mice, keyboards, touchscreens, voice input interfaces, vibration mechanism, still image and/or video capturing devices and/or other input/output interfaces and/or devices.

The ACS 206 may comprise suitable logic, circuitry, interfaces, and/or code that may be operable to control access to resource(s) of the electronic device 200 and/or network resource(s) by application(s) running and/or executing on the electronic device 200, such as, for example the application(s) 207. Some or all of the application(s) 207 may correspond to the application 140 as depicted in and/or described with respect to FIG. 1 and/or FIG. 4. The ACS 206 may be operable to manage application(s) (e.g., the application(s) 207) and/or data and/or information related to application(s). The ACS 206 may comprise a resource control module, such as, for example, the resource control module (RCM) 216. The ACS 206 maybe part of the operating system if present.

The RCM 216 may be operable to initiate, receive, process and/or manage a request, from an application, for the application to access a particular resource and/or a network resource. In this regard, the RCM 216 may be operable to analyze the request and to determine whether and/or when to grant and/or deny access to a particular resource and/or a network resource by the application.

In an example embodiment of the disclosure, the ACS 206 may monitor and/or analyze various applications (e.g., the application(s) 207) and/or processes running on the electronic device 200 to determine whether, for example, one or more application(s) requested access to a particular resource and/or network resource.

In an example embodiment of the disclosure, the ACS 206 may be operable to collect, analyze, process and/or manage data and/or information related to performance of various application(s) (e.g., the application(s) 207) running and/or executing on the electronic device 200. In this regard, the ACS 206 may collect, analyze, process and/or manage data related to, for example, whether application(s) request access to resources and/or network resources that may not be associated with items on a resource manifest and/or a URI whitelist associated with the application(s). For example, the ACS 206 may be operable to detect whether application(s) perform maliciously and may be operable to collect, analyze, process and/or manage data related to the malicious activity by the application(s).

In an example embodiment of the disclosure, the ACS 206 may communicate, to an application server (e.g., the application server 120 as depicted in and/or described with respect to FIG. 1) and/or a developer entity (e.g., the developer entity 130 as depicted in and/or described with respect to FIG. 1) associated with an application, data and/or information about malicious activity by the application.

In an example embodiment of the discourse, the electronic device 200 may be operable to run, process and/or manage software, functions and/or services associated with a platform that the electronic device 200 may be operating under (e.g., a platform associated with an operating system (OS)). In an example embodiment of the discourse, the electronic device 200 may be operable to run, process and/or manage software associated with application programming interfaces (APIs), external services (e.g., cloud storage), etc. that may be utilized by application(s) running and/or executing on the electronic device 200.

In an example embodiment of the disclosure, the electronic device 200 may implement a security model that may be utilized to control, for example when and/or how, applications running and/or executing on the electronic device 200 operate and/or access particular resources on the electronic device 200 and/or particular network resources. A security model may comprise various security policies and/or permissions that may be stored and/or processed by the electronic device 200. For example, the electronic device 200 may store the policies and/or permission in a memory (e.g., the memory 202) and/or manage and/or execute the policies and/or permissions on a processor (e.g., the main processor 201). A security model may comprise controlled APIs, sandboxing policies (e.g., policies for running and/or executing application on the electronic device 200 in isolation and/or screened to some extent from particular resources and/or network resources), and/or access control policies (e.g., granting and/or denying access to particular resources and/or network resources). The present disclosure is not limited to a particular security model.

In operation, an electronic device 200 may request to download an application from an application store. In this regard, the ACS 206 may request, from the communication module 203, for the communication module 203 to send a request to an application store (e.g., an application store managed by an application server, such as, for example, the application server 120 as depicted in and/or described with respect to FIG. 1) to download a particular application.

The communication subsystem 203 may communication with the application store (and/or the application server). In this regard, the communication subsystem may request from the application store (and/or the application server) an application and/or an application data. The communication subsystem 203 may receive and/or process the application and/or the application data received from the application store (and/or the application server).

In an example embodiment of the disclosure, the application and/or the application data may be received from an application server (e.g., the application server 120) and/or from a developer entity (e.g., the developer entity as depicted in and/or described with respect to FIG. 1). For example, the application server may store and/or mange applications and/or application data and/or the application server may store and/or or manage instructions for purchasing and/or downloading the applications and/or application data from an outside network location (e.g. a network location managed by, for example, a developer entity, such as, for example, the developer entity 130).

The communication subsystem 203 may communicate the received application and/or application data (e.g., instructions for installing, running and/or executing the application, a resource manifest associated with the application, a URI whitelist associated with the application) to the ACS 206.

The ACS 206 may receive and/or process the application and/or the application data. For example, the ACS 206 may initiate, process and/or manage the download and/or installation of the application and/or the application data on the electronic device 200 (e.g., in the memory 202). The ACS 206 may also process and/or store application permissions associated with the application, such as for example, a resource manifest and/or a URI whitelist.

In operation, the electronic device may control access to particular resources of the electronic device 200 and/or network resources. In this regard, when an application requests access to a particular resource and/or network resource, the ACS 206 may detect and/or process the request. The ACS 206 may request, from the RCM 216, for the RCM 216 to determine whether access to a particular resource and/or network resource may be granted to the application.

In an example embodiment of the disclosure the RCM 216 may determine whether a particular resource corresponds to a resource item associated with a resource manifest associated with the application that requested access to the particular resource. If the particular resource corresponds to a resource item, the RCM 216 may determine that access to the particular resource may be granted.

In an example embodiment of the disclosure the RCM 216 may determine whether a particular network resource corresponds to a URI item associated with a URI whitelist associated with the application that requested access to the particular network resource. If the particular network resource corresponds to a URI item, the RCM 216 may determine that access to the particular network resource may be granted.

The ACS 206 may grant access to a particular resource and/or network resource based on the determination by the RCM 216.

Figure 3:
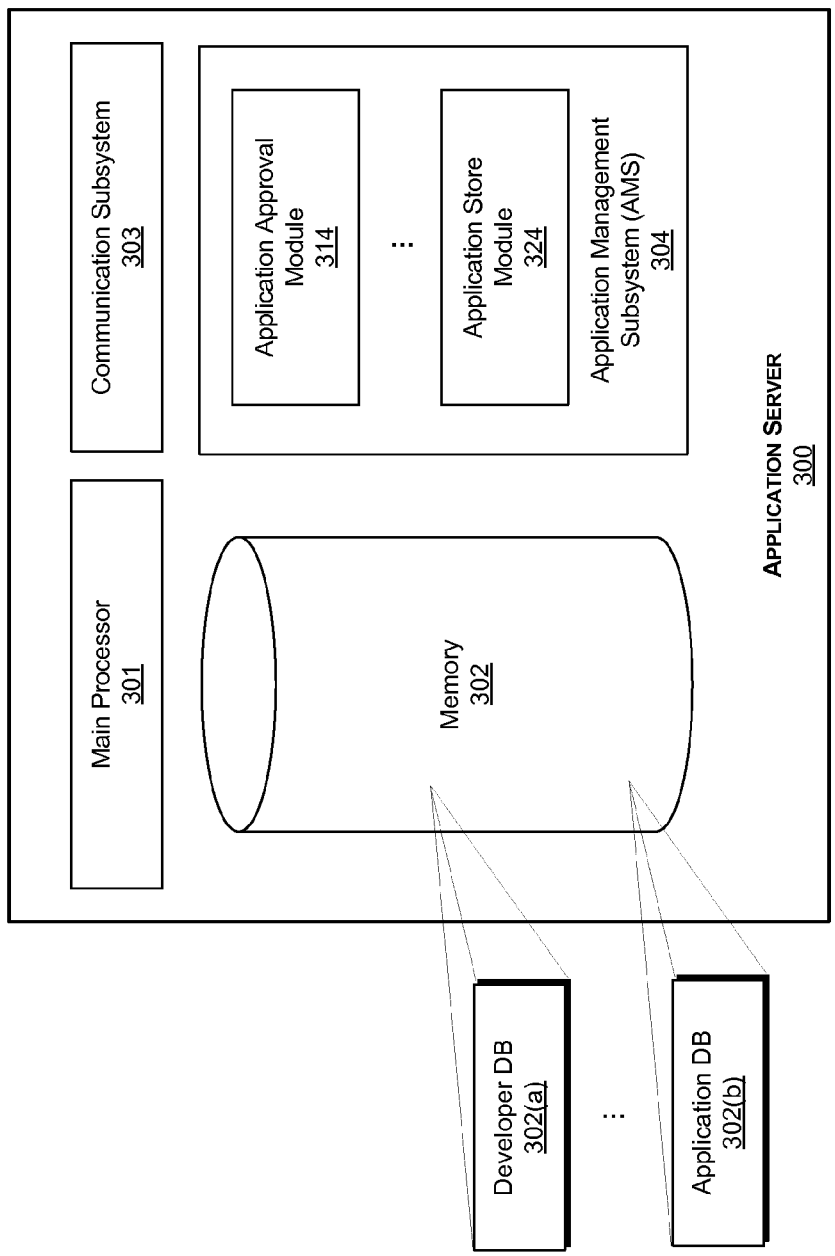
FIG. 3 is a block diagram of an example application server that supports using a URI whitelist, in accordance with an example embodiment of the disclosure.

FIG. 3 is a block diagram of example application server that supports using a URI whitelist, in accordance with an example embodiment of the disclosure. Referring to FIG. 3, there is shown an application server 300.

The application server 300 may comprise suitable logic, circuitry, code, and/or interfaces that may be operable to implement various aspects of the disclosure. In this regard, the application server 300 may correspond to the application server 120 of FIG. 1. The application server 300 may, for example, comprise a main processor 301, a memory 302, a communication subsystem 303 and/or an application management subsystem (AMS) 304.

The main processor 301 may comprise suitable circuitry, interfaces, logic, and/or code that may be operable to process data, and/or control and/or manage components, operations and/or functions of the application server 300, and/or tasks performed therein. In this regard, the main processor 301 may configure and/or control operations of various components and/or subsystems of the application server 300, such as, for example, the memory 302, the communication subsystem 303 and/or the AMS 304, by utilizing, one or more control signals.

The memory 302 may be substantially similar to, for example, the memory 202 of FIG. 2. In this regard, the memory 302 may comprise suitable logic, circuitry, interfaces, and/or code that that may be operable to enable permanent and/or non-permanent storage, buffering, and/or fetching of data, code and/or other information, which may be used, consumed, and/or processed by the components of the application server 300. In this regard, the memory 302 may be enabled to store executable instructions to manage and/or configure, for example, the main processor 301, the communication subsystem 303 and/or the AMS 304.

The memory 302 may comprise one or more databases such, as for example, a developer database 302(a) and/or an application database 302(b).

The developer database 302(a) may comprise a plurality of database objects each corresponding to a particular developer entity that may be associated with, for example, an individual and/or a company that may develop applications that may be accepted, screened, processed, managed and/or upsold to users of electronic services by, for example, the application server 300. In this regard, each entity may comprise information and/or data, such as, for example, developer account user name, developer account password, developer e-mail address, and/or developer category (e.g., developer of games, business, personal, social and/or networking applications, etc.).

The application database 302(b) may comprise a plurality of database objects each corresponding to an application, such as, for example, an application name, application type (e.g., game, business application, personal application, social networking application, etc.) and/or a developer entity associated with the application. The application may be developed by, for example, a developer entity, and/or submitted to the application server 300 for acceptance, screening (e.g., resource manifest evaluation, URI whitelist evaluation, etc.), processing, managing and/or upselling (e.g., providing purchasing options to users of electronic devices for purchasing applications submitted by a developer entity to the application server 300).

The communication subsystem 303 may be substantially similar to, for example, the communication subsystem 203 as depicted in and/or described with respect to FIG. 2. In this regard, the communication subsystem 303 may comprise suitable logic, circuitry, interfaces, and/or code that may be operable to communicate data from and/or to the application server 300, such as via one or more wired and/or wireless connections.

The AMS 304 may comprise suitable logic, circuitry, interfaces, and/or code that may be operable to provide application approval services and/or application upsell services. For example the AMS 304 may be enabled to provide application acceptance, screening (e.g., resource manifest evaluation, URI whitelist evaluation, etc.), processing, management and/or upsell (e.g., providing purchasing options to users of electronic devices (e.g., the electronic device 110) for purchasing applications submitted by, for example, a developer entity (e.g., the developer entity 130), etc.).

The AMS 304 may comprise, for example an application approval module 314 and/or an application store module 324.

The application approval module 314 may comprise suitable logic, circuitry, code, and/or interfaces that may be operable to provide application approval services (e.g., an approval for release in an application store). For example, the application approval module 314 may receive and/or process application(s) and/or application data (e.g., resource manifest, URI whitelist) from a developer entity. In this regard, the application approval module 314 may determine whether the application(s) and/or application data is within one or more a pre-determined criteria (e.g., application quality, content, functionality, description, necessity and/or reasonableness of items associated with a resource manifest and/or a URI whitelist, etc.).

In an example embodiment of the disclosure, the application approval module 314 may be operable to determine whether an application may be approved for release in an application store, based on, for example the contents (e.g., items) of a resource manifest and/or URI whitelist associated with the application.

The application store module 324 may comprise suitable logic, circuitry, code, and/or interfaces that may be operable to provide application release and/or upsell services (e.g., application purchasing and/or downloading services, etc.) that may be based on application approval services, such as, for example, the application approval services provided by the application approval module 314. In this regard, the application store module 324 may release an application to an application store, based on, for example, an approval by the application approval module 314.

In an example embodiment of the disclosure, the application store module 324 may be operable to provide application browsing, purchasing and/or downloading services to electronic devices (and/or users of electronic devices).

In operation, the application server 300 may be operable to receive, from a developer entity, such as, for example, the developer entity 110, a request for approving an application for release in an application store. In this regard, the communication subsystem 303 may receive and/or process the request. The request may comprise an application, a representation of an application (e.g., executable instructions and/or code that may make the application operable on an electronic device) and/or application data. The application data may, for example, comprise a resource manifest and/or a URI whitelist associated with the application. The application data may also comprise other developer and/or application related data (e.g., developer name, developer identifier, application version, application category, application executable instructions, etc.).

In an example embodiment of the disclosure, the request may comprise data and/or information relating to a developer entity. In this regard, the AMS 304 may determine whether the request corresponds to a particular developer entity. For example, the AMS 304 may initiate a search on a developer database, such as, for example, the developer database 302(a), to determine a particular entity associated with the request and/or the application subject to the request.

In an example embodiment of the disclosure, the request may comprise data and/or information relating to a particular application (e.g., an existing application which, for example, is already available in the application store and the request comprises, for example, another version and/or release of the existing application and/or a fix and/or an update to the existing application, etc.). In this regard, the AMS 304 may determine whether the request corresponds to a particular application. For example, the AMS 304 may initiate a search on an application database, such as, for example, the application database 302(b), to determine a particular application associated with the request and/or the application subject to the request. The AMS 304 may also initiate a search on the application database 302(b), to determine a particular developer entity associated with the request and/or the application subject to the request.

The AMS 304, in response to the request, may determine various application approval criteria that may be applicable to the request and/or to the application subject to the request. The criteria may include application quality criteria, such as, for example user experience criteria (e.g., graphics, error-free operation, etc.), application upsell quality criteria (e.g., developer description, application description, application category, etc.), application content criteria (e.g., content approved for a particular category of an application), application security criteria (e.g., content of a resource manifest and/or a URI whitelist, etc.) and/or other application functionality criteria.

In an example embodiment of the disclosure, the AMS 304 may determine, based on, for example, the request and/or the application subject to the request, one or more application approval criteria and may request from the application approval module 314 to analyze and/or process all or some application data (e.g., that may be received as part of the request to approve an application for release in an application store) to determine whether the application meets one or more of the one or more application approval criteria.

The AMS 304 may request from the application approval module 314 to analyze and/or process the application data separately with respect to each of the one or more application approval criteria and/or collectively for one or more of the one or more application approval criteria. For example, the AMS 304 may send one request to the application approval module 314 corresponding for each of the one or more application approval criteria (e.g., applicable to the request and/or the application subject to the request based on the determination by the AMS 304). In another example, the AMS 304 may send one request to the application approval module 314 for any combination of the one or more application approval criteria.

In an example me embodiment of the disclosure, the AMS 304 may determine that the request comprises a resource manifest and/or a URI whitelist associated with the application subject to the request for approval.

Based on the determination, the AMS 304 may determine that one or more application security criteria apply, such as, for example, necessity and/or reasonableness of contents (e.g., items associated with the resource manifest and/or the URI whitelist).

In this regard, AMS 304 may request from the application approval module 314 for the application approval module 314 to analyze the resource manifest, the URI whitelist and/or their respective contents to determine whether they meet one or more application security criteria.

In an example embodiment of the disclosure, the application approval module 314 may analyze the resource manifest to determine whether the contents of the resource manifest (e.g., resource items associated with the resource manifest) are, for example, necessary and/or reasonable with respect to resources of an electronic device to which an access may be requested during an operation and/or execution of the application.

In an example embodiment of the disclosure, the application approval module 314 may analyze the URI whitelist to determine whether the contents of the URI whitelist (e.g., URI items associated with the URI whitelist) are, for example, necessary and/or reasonable with respect to network resources to which an access may be requested during an operation and/or execution of the application.

The application approval module 314 may communicate with the AMS 304. In this regard, the application approval module 314 may send to the AMS 304 data and/or information indicative of whether one or more application approval criteria may be met (e.g., the one or more application approval criteria that where the subject of a request from the AMS 304 to the application approval module 314).

The AMS 304 may determine, based on, for example, the data and/or information received from the application approval module 314 whether an application may be released to the application store.

In an example embodiment of the disclosure, the AMS 304 may add and/or modify an entry in an application database, such as, for example the application database 302(b), where the entry may indicate that the application may or may not be approved for release in an application store.

The AMS 304 may request from the communication subsystem 303 for the communication subsystem 303 to send, to the developer entity, a notification, which may comprise application receipt data. The application receipt data may comprise data and/or information indicative of whether the application may be released to the application store.

In an example embodiment of the disclosure, the application server 300 may use a variety of different communication methods to communicate with the developer entity. For example, the communication subsystem 303 may, based on, for example, a request from the AMS 304, send, to the developer entity, an e-mail message (e.g., to an e-mail address associated with the developer entity, where the e-mail address may be retrieved from, for example, the developer database 302(a)) and/or another message that may be received and/or retrieved by the developer entity (e.g., a message in an application that may support communication between the developer entity and the application server 300, through, for example, an API and/or on-line interface (e.g., web browser interface).

In operation, the application server 300 may be operable to release an application to an application store. The application may be released to an application store if, for example, the application was approved for release during an approval process as performed by, for example, the ACS 304 and/or the application approval module 314. In this regard, the AMS 204 may request from the application store module 324 for the application store module 324 to release an approved application to an application store. For example, the application store module 324 may add and/or modify an entry in an application database, such as, for example the application database 302(b), where the entry may indicate that the application may be available in the application store (e.g., available for browsing, purchasing, downloading, etc.).

In operation, the application server 300 may be operable to receive, from an electronic device, a request to purchase and/or download an application from an application store. In this regard, the communication subsystem 303 may receive and/or process the request and may send the request (processed or unprocessed) to the AMS 304. The request may comprise download related data (e.g., data about the requested application, the type of the operating system on the electronic device, the type of the electronic device, etc.) that may be relevant to the purchasing and/or downloading of the application. The AMS 304 may analyze the request to prepare the application and/or application data for download to the electronic device. For example, the AMS 304 may determine a version of the application that may have to be prepared for purchasing and/or download, based on, for example, an operating system of the electronic device, the type of the electronic device (e.g., smartphone, tablet, etc.).

In an example embodiment of the disclosure, the AMS 304 may send to the electronic device, the application, executable instructions for downloading and/or installing the application (e.g., from an application server, such as, for example, the application server 300 or a third-party server, such as, for example, a developer entity associated with the application) and/or application data (e.g., a resource manifest, a URI whitelist, etc.).

The components of the application server 300, such as, for example, the main processor 301, the memory 302, the communication subsystem 303 and/or the AMS 304 may be implemented in an integrated or a distributed system. An integrated system may be implemented, for example, on one computer, server, machine or device, where the integrated system may be configured to perform some or all of the functions, features and/or operations of the main processor 301, the memory 302, the communication subsystem 303 and/or the AMS 304 as described herein. A distributed system may be implemented with multiple components (e.g., computers, servers, machines and/or devices), where each of the multiple components may be configured to perform some or all of the functions, features and/or operations of the main processor 301, the memory 302, the communication subsystem 303 and/or the AMS 304 as described herein. Each function, feature and/or operation may be implemented on one or more of the components of the distributed system. For example, a specific feature, function and/or operation may be implemented on one component of the distributed system or it may be implemented across multiple components of the distributed system.

Figure 4:
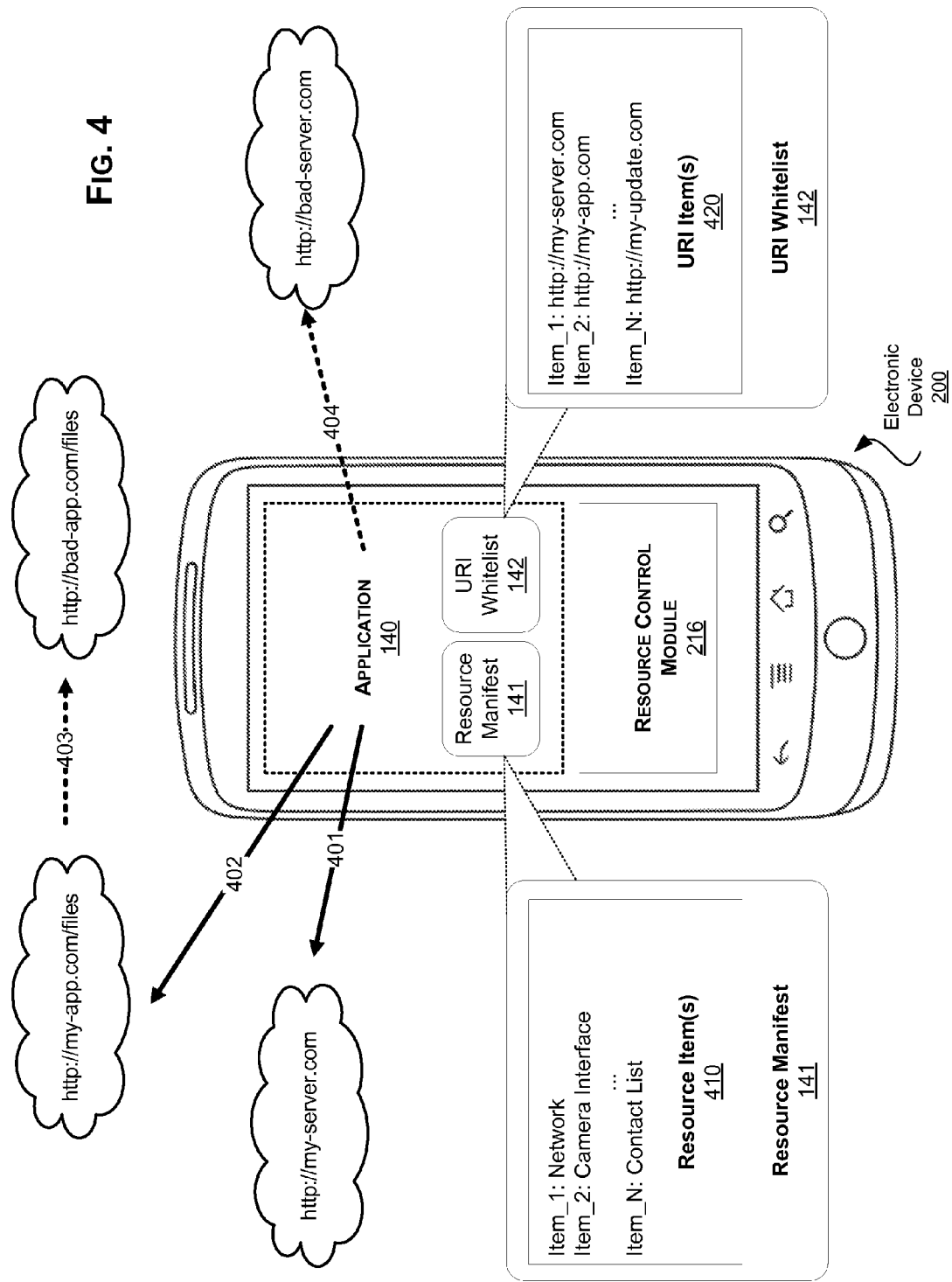
FIG. 4 is a block diagram of an example resource access control using a URI whitelist, in accordance with an example embodiment of the disclosure.

FIG. 4 is a block diagram of an example resource access control using a URI whitelist, in accordance with an example embodiment of the disclosure. Referring to FIG. 4, there is shown an electronic device (e.g., the electronic device 200 as depicted in and/or described with respect to FIG. 2) and/or an application (e.g., the application 140 as depicted in and/or described with respect to FIG. 1) that may be operating on the electronic device.

The application (e.g., the application 140) may be associated with a resource manifest (e.g., the resource manifest 141 as depicted in and/or described with respect to FIG. 1) and/or a URI whitelist (e.g., the URI whitelist 142 as depicted in and/or described with respect to FIG. 1).

The resource manifest 141 may comprise one or more resource items, such as, for example, the resource item(s) 410. A resource item (e.g., resource item(s) 410) may correspond to a resource on the electronic device (e.g., the electronic device 200) on which the applications is operating. Example resource item(s) may comprise example resource items(s) 410. The resource item(s) 410 may comprise resource items 1 though N (e.g., Item 1, Item_2, . . . Item_N). An example "Item_1" may correspond to network (e.g., an internet network, a Wi-Fi connection, a LAN connection, etc.). An example "Item_2" may correspond to a camera interface. An example "Item_N" may correspond to a contact list.

The URI whitelist 142 may comprise one or more URI items, such as, for example, the URI item(s) 420. A URI item may correspond to a network resource which may be, for example, accessible through a network. The access may be facilitated by the electronic device (e.g., the electronic device 200), if, for example, access to the network is granted to the applications by the electronic device. Example URI item(s) may comprise example URI items(s) 420. The URI item(s) 420 may comprise URI items 1 though N (e.g., Item 1, Item_2, . . . Item_N). An example "Item_1" may correspond to a network location "http://my-server.com". An example "Item_2" may correspond to a network location "http://my-app.com". An example "Item_N" may correspond to a network location "http://my-update.com".

In operation, the applications 140 may request from the electronic device 200 to access a particular network resource through an example request 401, 402 and/or 404. The electronic device 200 may receive and/or process the request through, for example, a resource control module, such as for example, the resource control module (RCM) 216 as depicted in and/or described with respect to FIG. 2.

In an example embodiment of the disclosure, the application 140 may request to access one or more network location (s) (e.g., request(s) 401, 402, 404). For each of the example network access requests 401, 402, 404), the RCM 216 may analyze the resource manifest 141 and may determine that the application may be granted network access, because, for example, the example resource Item_1 of the resource item(s) 410 corresponds to the network.

In the example network access request 401, the application 140 may request to access an example network location "http://my-server.com". The RCM 216 may analyze the URI whitelist 142 and may determine that the application may be granted access to the example network location "http://my-server.com", because, for example, the example network location "http://my-server.com" corresponds to example URI Item_1 of the URI item(s) 420.

In the example network access request 402, the application 140 may request to access an example network location "http://my-app.com/files". The RCM 216 may analyze the URI whitelist 142 and may determine that the application may be granted access to the example network location "http://my-app.com/files", because, for example, the example network location "http://my-app.com/files" corresponds to a pattern of network locations corresponding example URI Item_2 of the URI item(s) 420. In an example embodiment of the disclosure, the RCM 216 may monitor the network access by the application 140 to, for example, determine whether the access to the example network location "http://my-app.com" results in fact in access to the same example network location. In a case, where, for example, upon access to the approved example network location (e.g., "http://my-app.com/files"), a redirect (e.g., intermediate redirect request 403) occurs, the RCM 216 may detect the redirect (e.g., to "http://bed-server/files") and may analyze whether the redirect may result in access to a network location that may correspond to an approved URI item. In this example, the RCM 216 may determine that the redirect request 403 may result in access to a network location "http://bad-server.com/files". The RCM 216 may analyze the URI whitelist 142 and may determine that the application may not be granted access to the example redirect network location "http://bed-server/files", because, for example, the example redirect network location "http://bed-server/files" does not corresponds to any of the example URI item(s) 420.

In the example network access request 404, the application 140 may request to access an example network location "http://bad-server.com". The RCM 216 may analyze the URI whitelist 142 and may determine that the application may not be granted access to the example network location, because, for example, the example network location "http://bad-server.com" does not corresponds to any of the example URI item(s) 420.

Figure 5:
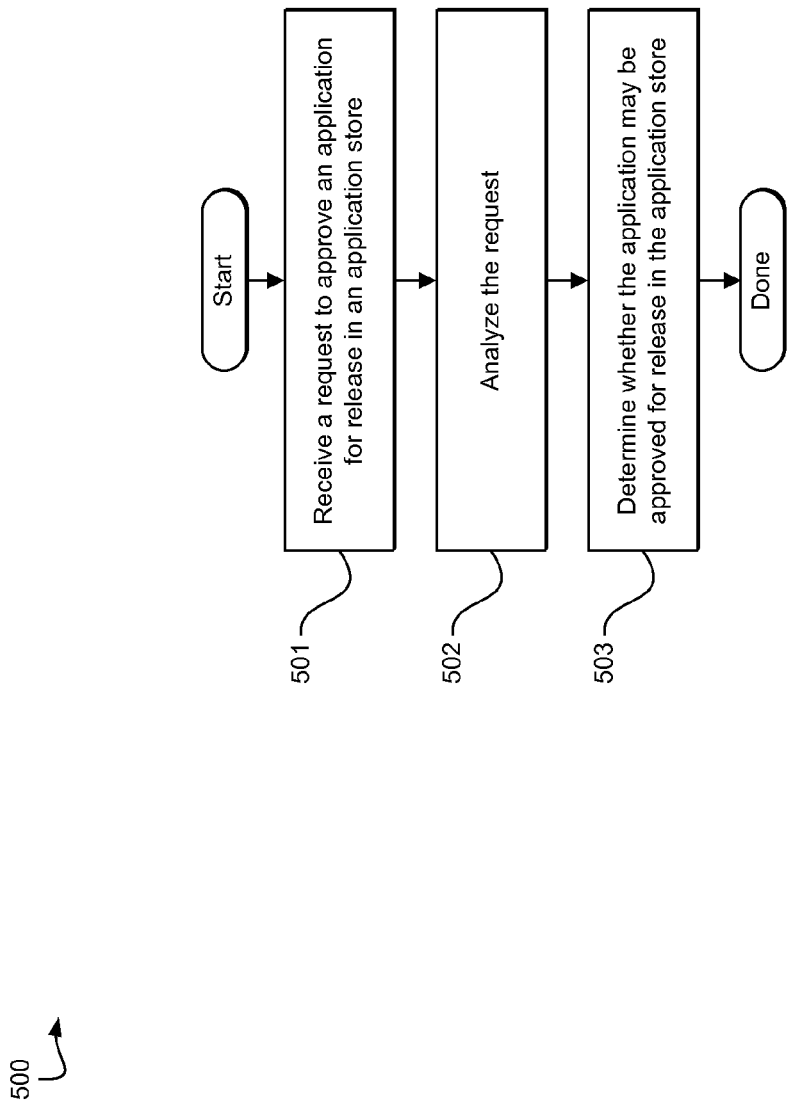
FIG. 5 is a flow diagram of example steps of a method for using a URI whitelist, in accordance with an example embodiment of the disclosure.

FIG. 5 is a flow diagram of example steps of a method for using a URI whitelist, in accordance with an example embodiment of the disclosure. Referring to FIG. 5, an example method 500 is shown comprising a plurality of example steps for using a URI whitelist. The example steps of the example method 500 may be performed by an application server, such as, for example, the application server 120 and/or 300.

In an example step 501, a request to approve an application for release in an application store may be received. The request may be received from an application developer (e.g., a developer entity, such as, for example, the developer entity 130). The request may comprise the application and/or application data. The application data may comprise a resource manifest and/or a URI whitelist.

In an example step 502, the request may be analyzed based on, for example, the application data. For example, the resource manifest and/or the URI whitelist may be analyzed. In this regard, a determination may be made whether contents (e.g., items) of the resource manifest and/or the URI whitelist may be necessary and/or reasonable with respect to, for example, the application type, category, etc.

In an example step 503, a determination whether the application may be approved for release in the application store may be made based on, for example, the determination made in the example step 502. For example, if the resource items associated with the resource manifest and/or the URI items associated with the URI whitelist are necessary and/or reasonable the application may be approved for release in the application store. The present disclosure is not limited to the steps in the example method 500.

Figure 6:
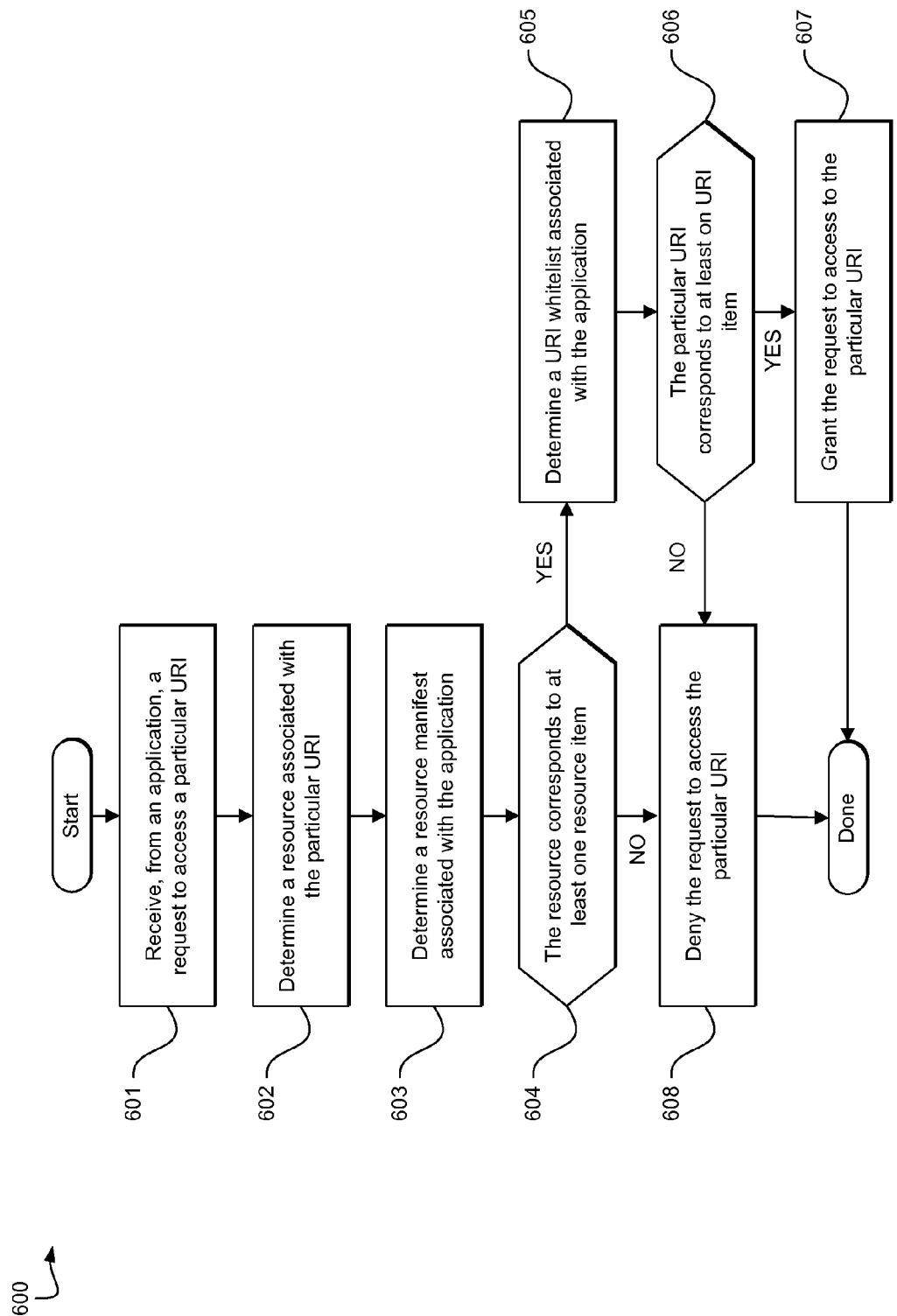
FIG. 6 is a flow diagram of example steps of another method for using a URI whitelist, in accordance with an example embodiment of the disclosure.

FIG. 6 is a flow diagram of example steps of another method for using a URI whitelist, in accordance with an example embodiment of the disclosure. Referring to FIG. 6, an example method 600 is shown comprising a plurality of example steps for using a URI whitelist. The example steps of the example method 600 may be performed by an electronic device, such as, for example, electronic device 110 and/or 200.

In an example step 601, a request to access a particular URI may be received from an application. For example, an application running and/or executing on an electronic device may request access to a particular network resource (e.g., a particular URI).

In an example step 602, a determination of a resource associated with the particular URI may be made. For example, a URI may be associated with a network. In this regard, the determination may be made that access to the particular URI requires access to the network (e.g., the network may correspond to a resource on the electronic device).

In an example step 603, a determination of a resource manifest associated with the application may be made. The resource manifest may comprise one or more resource items, where some or all of the one or more resource items may correspond to one or more resources of the electronic device (e.g., camera interface, contest list, network, etc.).

In an example step 604, a determination of whether the resource corresponds to at least one of the one or more resource items may be made. In this regard, the resource determined in the example step 602 may be compared with one or more resource items in the resource manifest to determine whether the resource corresponds to at least one of the one or more resource items. For example, if the resource determined in the example step 602 is a network (e.g., access to the particular URI requires access to the network) and, for example, one of the one or more resource items also corresponds to a network, then a determination may be made that the resource corresponds to at least one of the one or more resource item (e.g., an resource item corresponding to the network).

If the resource corresponds to at least one of the one or more resource items, the example steps continue at the example step 605. If the resource does not correspond to any one of the one or more resource items, the example steps continue at the example step 608.

In an example step 605, a determination of a URI whitelist associated with the applications may be made. The URI whitelist may comprise one or more URI items (e.g., a network location, such as, for example, a website, an ftp site, etc.).

In an example step 606, a determination whether the particular URI corresponds to at least one of the one or more URI items may be made. In this regard, the particular URI to which access may have been requested in the example step 601 may be compared with one or more URI items in the URI whitelist to determine whether the particular URI corresponds to at least one of the one or more URI items. If the particular URI corresponds to at least one of the one or more URI items, the example steps continue at the example step 607. If the particular URI does not correspond to any one of the one or more URI items, the example steps continue at the example step 608.

In an example step 607, the request to access the particular URI may be granted. For example, the application may be allowed to access the particular URI (e.g., a particular website, internet host, ftp host, etc.).

In an example step 608, the request to access the particular URI may be denied. For example, the application may not be allowed to access the particular URI. In an example embodiment of the disclosure, a notification may be presented to a user of the electronic device to inform the user that the application requested to access the particular URI and that the access to the particular URI was denied. The notification may comprise information relating to a reason why the application was denied access to the particular URI. The notification may comprise an option for the user to request from the electronic device to bypass application permission (e.g., as defined by the resource manifest and/or the URI whitelist associated with the applications) and allow access to the particular URI (e.g., even if the particular URI may not correspond to any one of the URI items associated with the URI whitelist). The present disclosure is not limited to the steps in the example method 600.

Other implementations may provide a computer readable medium and/or storage medium, and/or a machine readable medium and/or storage medium, having stored thereon, a machine code and/or a computer program having at least one code section executable by a machine and/or a computer, thereby causing the machine and/or computer to perform the steps as described herein for using a URI whitelist.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other system adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computing device comprising one or more memory units that store computer code and/or one or more processor units coupled to the one or more memory units. The one or more processor units may execute the computer code stored in the one or more memory units to adapt the computing device to enable the implementation of the system(s) and/or method(s) herewith described.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
in a computing device:

receiving a request to approve an application for release in an application store, wherein the application is associated with an application developer and wherein the request comprises application data including more than one resource manifest and more than one Uniform Resource Identifier (URI) whitelist;
analyzing the request based on the application data; and
determining whether the application may be released in the application store based on the analyzing.

2. The method of claim 1, wherein each resource manifest included in the application data comprises one or more resource items and wherein each URI whitelist included in the application data comprises one or more URI items.

3. The method of claim 2, further comprising:
releasing an approved application to the application store in response to the request to approve the application for release in the application store, wherein the approved application comprises an approved resource manifest and an approved URI whitelist;
wherein the approved resource manifest comprises one or more approved resource items;
wherein the approved URI whitelist comprises one or more approved URI items; and
wherein at least one of the URI items does not correspond to any of the one or more approved URI items.

4. The method of claim 2, further comprising:
communicating, to the application developer, application receipt data, wherein the application receipt data comprises data indicative of whether the application was approved for release in an application store.

5. The method of claim 4,
wherein the application data comprises information data and option data;
wherein the information data indicates that the application may be released in the application store as an approved application;
wherein the option data provides an option to the application developer to approve the release of the application in the application store as the approved application;
wherein the approved application comprises an approved resource manifest and an approved URI whitelist;
wherein the approved resource manifest comprises one or more approved resource items;
wherein the approved URI whitelist comprises one or more approved URI items; and
wherein at least one of the URI items does not corresponds to any of the one or more approved URI items.

6. The method of claim 5, further comprising:
receiving modification approval data, from the application developer, wherein the modification approval data comprises an approval by the application developer to release the application in the application store as the approved application.

7. The method of claim 1, further comprising:
receiving, from an electronic device, a request to access the application; and
sending, to the electronic device, a response to the request to access the application, wherein the response comprises the application data.

8. A computing device, comprising:
one or more memory units that store computer code;
one or more processors coupled to the one or more memory units, the one or more processors being operable to execute the computer code stored in the one or more memory units to adapt the computing device to:
receive a request to approve an application for release in an application store, wherein the application is associated with an application developer and wherein the request comprises application data and wherein the application data comprises more than one resource manifest and more than one Uniform Resource Identifier (URI) whitelist;
analyze the request based on the application data; and
determine whether the application may be released in the application store based on the analyzing.

9. The computing device of claim 8, wherein each resource manifest included in the application data comprises one or more resource items and wherein each URI whitelist included in the application data comprises one or more URI items.

10. The computing device of claim 9, wherein the one or more processors is further operable to:
release an approved application to the application store in response to the request to approve the application for release in the application store, wherein the approved application comprises an approved resource manifest and an approved URI whitelist;
wherein the approved resource manifest comprises one or more approved resource items;
wherein the approved URI whitelist comprises one or more approved URI items; and
wherein at least one of the URI items does not correspond to any of the one or more approved URI items.

11. The computing device of claim 9, wherein the one or more processors is further operable to:
communicate, to the application developer, application receipt data, wherein the application receipt data comprises data indicative of whether the application was approved for release in an application store.

12. The computing device of claim 11,
wherein the application data comprises information data and option data;
wherein the information data indicates that the application may be released in the application store as an approved application;
wherein the option data provides an option to the application developer to approve the release of the application in the application store as the approved application;
wherein the approved application comprises an approved resource manifest and an approved URI whitelist;
wherein the approved resource manifest comprises one or more approved resource items;
wherein the approved URI whitelist comprises one or more approved URI items; and
wherein at least one of the URI items does not corresponds to any of the one or more approved URI items.

13. The computing device of claim 12, wherein the one or more processors is further operable to:
receive modification approval data, from the application developer, wherein the modification approval data comprises an approval by the application developer to release the application in the application store as the approved application.

14. The computing device of claim 13, wherein the one or more processors is further operable to:
receive, from an electronic device, a request to access the application; and
send, to the electronic device, a response to the request to access the application, wherein the response comprises the application data.

* * * * *